3,159,354
SERIES MOTOR CONSTRUCTION FOR A FOOD WASTE DISPOSAL UNIT
Johnny W. Yartz, Anchorage, Ky., and Marcus P. Hogue, Hendersonville, N.C., assignors to General Electric Company, a corporation of New York
Filed May 16, 1962, Ser. No. 195,210
7 Claims. (Cl. 241—46)

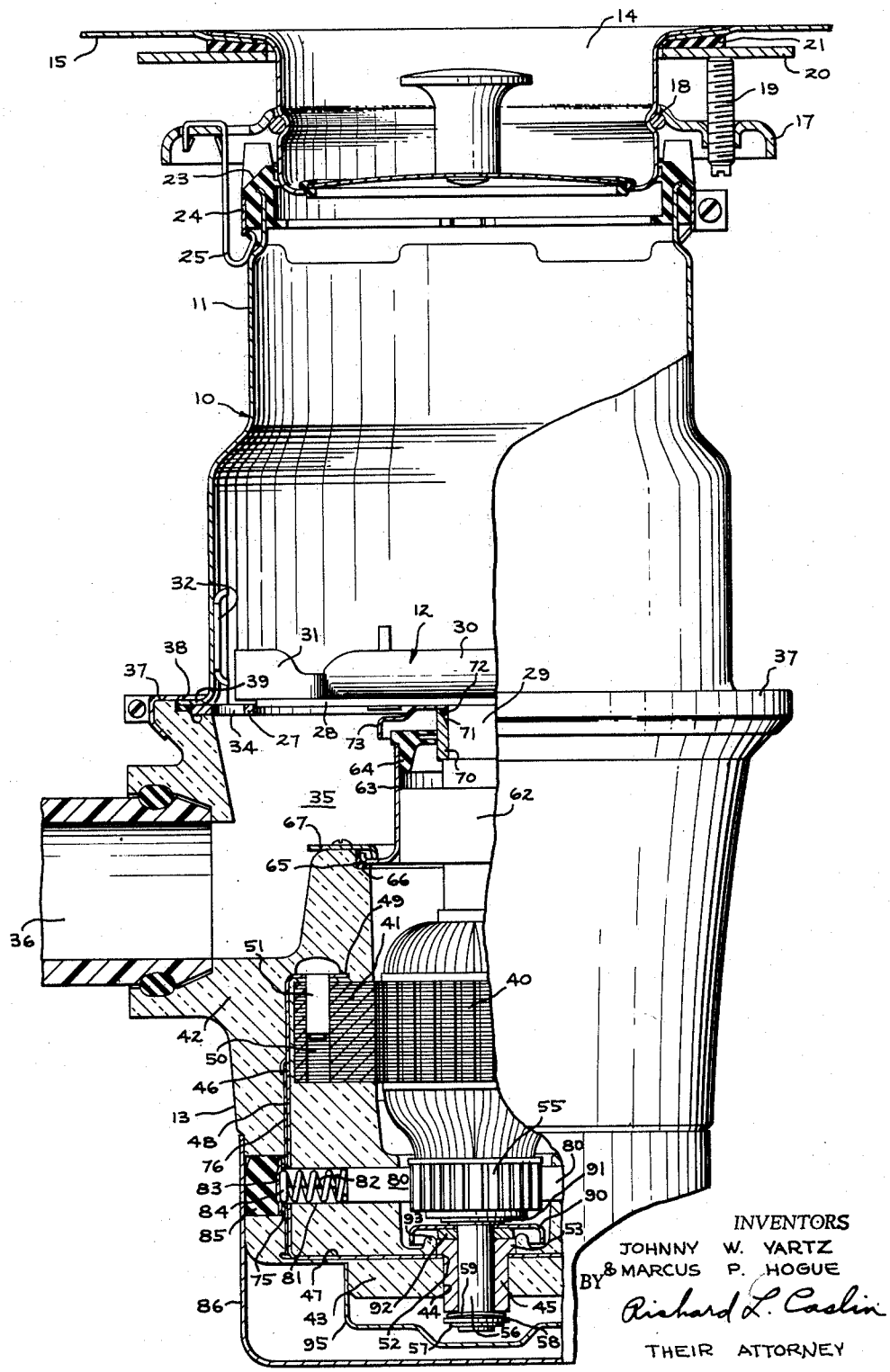

This invention relates to electric motors and particularly to an encapsulated series wound motor for use with a food waste disposer apparatus where the motor is to be operated in a vertical position.

A conventional food waste disposer apparatus includes a vertically-extending hopper means having a top access opening for receiving water and waste material therethrough. The hopper means is adapted to be suspended below the drain opening of the kitchen sink. Rotatable comminuting means are disposed adjacent the bottom of the hopper, and an electrically driven power means is provided below the comminuting means and operatively joined thereto for driving the comminuting means. A suitable drain line is connected to a sump beneath the comminuting means for carrying off the water-entrained food waste into the sewer system provided for the home.

In the past, most of the electric motors used in food waste disposers have been single phase induction motors. The present invention is concerned with the use of a series wound motor which may be termed a potted or encapsulated motor where the stator is cast into a non-magnetic material such as a suitable formulation of epoxy resin. Such a potted motor is a totally enclosed motor in that moisture and other deleterious elements may not enter to do harm to the motor assembly. Most of the potted motors known heretofore have been single phase induction motors. A problem arises when a series motor is encapsulated, in that a series motor includes a commutator that is integral with the armature as well as a pair of carbon brushes in running engagement with the commutator. The carbon brushes wear down as the motor is operated resulting in a deposit or carbon dust within the motor housing. This dust comes in contact with the high speed armature which is turning at a rate of speed between 6000 and 8000 revolutions per minute and this stirs up a cloud of carbon dust that tends to permeate the interior of the enclosed motor housing, especially in the vicinity of the nearest motor bearing.

The principal object of the present invention is to provide a vertically disposed encapsulated series motor with a shielding means so as to prevent carbon dust from shorting out the motor.

A further object of the present invention is to provide an encapsulated series motor for use in food waste disposer apparatus so that carbon dust formed by the wear or attrition of the brushes will not shorten the life of the motor.

A still further object of the present invention is to provide a novel means for supporting and capturing the carbon brushes in an encapsulated series motor.

Briefly stated, in accordance with one aspect of this invention, we provide a series motor that is adapted for use in a vertical position as will be required in a food waste disposer apparatus. Such a motor would include an armature and a stator that is cast into a non-magnetic motor housing. The lower end of the housing is provided with a bottom wall in which is mounted a fixed bearing for receiving one shaft end of the armature. The top portion of the motor housing is provided with a relatively wide opening so that the armature may be inserted therethrough. A separable bearing member is used at the top of the motor for supporting and guiding the armature, and a fastening means is used for holding the separable bearing fixed in the motor housing thereby forming an enclosed motor assembly. The armature includes a commutator that is fixed to the shaft thereof, and suitable openings are formed in the motor housing for supporting the carbon brushes that cooperate with the commutator. A shielding member is fixed to the shaft of the armature adjacent the commutator, and this shield serves to overlie the lower fixed bearing and provide a labyrinth so as to prevent carbon dust from forming a conductive path as the dust is generated while wear takes place in the brushes during opeartion of the motor. Various improvements may be added to this basic structure such as a raised collar around the fixed lower bearing to further complicate the possibility of the carbon dust forming a conductive path to the lower bearing. Moreover, novel means are used for backing up the carbon brushes with a biasing force as well as holding the brushes in place during use.

Our invention will be better understood from the following description taken in conjunction with the accompanying drawing and its scope will be pointed out in the appended claims.

The single figure of the drawing shows a food waste disposer apparatus incorporating the present invention with certain parts broken away and others in cross section to show the method of supporting the disposer from the sink flange of a kitchen sink, the method of construction of the disposer as well as the particular construction of the encapsulated series motor mentioned above.

Turning now to a consideration of the drawing, there is shown a detailed illustration of one embodiment of the present invention applied to a food waste disposer 10 which comprises three main parts; namely, a cylindrical hopper 11, a rotatable comminuting means 12 located adjacent the bottom of the hopper and a vertically disposed motor assembly 13 in which the present invention is incorporated. The upper end of the hopper 11 is designed to be suspended from the drain opening or sink flange 14 of a typical kitchen sink 15 or the like. Any suitable suspension means may be employed, as for example, the design disclosed and claimed by Johnny W. Yartz and Francis J. Clements in U.S. Patent 3,108,755, which issued on October 29, 1963, and is assigned to the General Electric Company, the same assignee as in the present invention.

Briefly, the suspension means comprises an annular mounting ring 17 which is adapted to be telescoped over the sink flange 14 and supported therefrom by an underlying snap ring 18 or the like. The sink flange 14 is held tightly in the drain opening of the sink 15 by a plurality of spaced bolts 19 which are threaded through the mounting ring 17. These bolts 19 may be elevated to bear against a clamping ring 20 which underlies the bottom of the sink 15, but is spaced therefrom by a resilient sealing gasket 21 of rubber or the like material. This clamping action of the bolts 19 between the mounting ring 17 and the clamping ring 20 is performed or completed prior to the assembly of the disposer 10 to the mounting ring 17 as will be well understood by those skilled in this art.

The upper end of the hopper 11 is provided with a sealing gasket 23 of elastomeric or the like material which is clamped around the mouth of the hopper by a metal band 24. The mounting ring 17 supports a plurality of metallic hook members 25 that depend from the underside thereof for snapping engagement beneath the clamping band 24 for a quick-connect assembly of the disposer to the mounting ring 17 and thence through the mounting ring to the sink flange 14. A twisting action of the disposer is necessary in order to effect the withdrawal of the hook members 25 from the clamping band 24 so that the disposer may be disassembled from the sink flange when desired. Since the illustrated suspension means does not form part of the present invention, a more detailed showing and explanation is deemed unwarranted, so that particular emphasis can be given to the principal invention of this application.

The bottom of a disposer hopper 11 terminates adjacent the mid-height of the disposer. Within this lower area of the hopper there is provided a comminuting means 12 which is shown only in general outline since any suitable comminuting means may be employed, as for example, a rotatable comminuting assembly disclosed and claimed by one of the present applicants, Johnny W. Yartz in U.S. Patent 3,112,077, which issued on November 26, 1963, and is assigned to the General Electric Company the same assignee as in the present invention. In general terms this comminuting means comprises an annular straining ring 27 which is located around the inner periphery of the hopper and is concentric with an inner circular flywheel 28 which is fastened to the shaft 29 of the motor 13 so that the motor serves as the source of power for the comminuting means. The flywheel 28 is held to the shaft 29 by a retaining member 30 which also serves as a pivot means for a pair of swinging impellers or hammers 31 which are acted upon by centrifugal force when the flywheel is rotated to swing out over the straining ring 27. These impellers cooperate with one or more grinding pads 32 which are welded or otherwise fastened to the inner surface of the lower portion of the hopper 11 as is more fully explained in the above-mentioned U.S. Patent 3,112,077.

During the grinding operation water is caused to flow continuously into the hopper and through a plurality of openings 34 in the straining ring 27 for transporting the comminuted waste into a relatively large sump 35 located in the top of the housing of the motor 13 and directly beneath the comminuting means 12. A sewer connection 36 is formed in the side wall of the motor housing in the vicinity of the sump 35 for carrying off the water-entrained food waste that has passed through the comminuting means. It will be understood that it is necessary to fasten together the top portion of the motor 13 and the bottom portion of the hopper 11 and this is accomplished by a split clamping band 37 which encircles the top rim of the motor housing and has a horizontal portion 38 which provides a downward force against an outwardly directed flange 39 formed or rolled on the lower portion of the hopper 11.

The disposer motor 13 is a series wound motor that is adapted to be operated in a vertical position and it includes an armature 40 that is adapted to run within a stator 41 made up of a stack of laminations which are provided with field windings (not shown) where the windings are in series with the armature windings. The stator 41 is to be cast in the motor housing of non-magnetic material such as a suitable epoxy resin 42. This casting includes not only the motor housing but it also establishes the side walls of the sump 35 and the opening for the sewer connection 36. The motor housing is generally of cylindrical shape with a bottom wall 43, cylindrical side walls and a top portion through which the rotor shaft assembly 40 is installed with the stator and in which the flywheel 28 is mounted. The bottom wall 43 of the motor housing includes a central opening 44 in which is installed the lower bearing 45 for the rotor of sintered bronze material or the like.

A grounding strap 46 of steel strip is connected between the stator 41 and the lower bearing 45 for making the series connection between the armature winding and the field winding. This grounding strap 46 is generally of U-shape having a bight portion 47 molded into the bottom wall 43 of the motor housing and a pair of vertical arms 48 which extend to the top of the stator and have an inwardly formed tab 49. This stator is provided with a vertical bore 50, and a drive pin 51 is forced through a close fitting opening in the tab 49 of the strap and into the bore 50 for making a permanent connection therewith. This same connection is made with the other arm 48 which is not shown in the drawing. The bight portion 47 of the grounding strap 46 has a central opening 52 in its central portion through which the lower bearing 45 is inserted. This bearing has a large shoulder 53 which is adapted to seat on the strap as is shown, thereby establishing continuity between the ground strap and the armature of the motor.

The armature 40 is provided with a commutator 55 and a lower shaft portion 56. This lower shaft portion 56 is inserted into the lower bearing 45 and is provided with a circular undercut for receiving a retaining clip 57. Sandwiched between the clip 57 and the lower end of the bearing 45 is a flat washer 58 and a bowed washer 59 respectively so as to eliminate end play in the assembly.

Once the armature is located within the motor housing, the upper motor bearing 62 must be installed. It also is of sintered bronze as is the lower bearing 45. The bearing 62 is combined in a sub-assembly of a brass bearing cup 63 of generally cylindrical shape which supports at its upper end a water tight gasket 64 of elastomeric material or the like. The lower end of this cup is flanged outwardly to form a wide area seat that fits over an annular gasket 65 that is placed on a circular ledge 66 within the throat of the cavity for the armature. An annular clamping ring 67 is fastened to the motor housing to overlie the flange of the bearing cup 63. Cooperating with the resilient seal member 64 is a seal bushing 70 of stainless steel which is inserted over the reduced end 29 of the shaft of the armature for obtaining a reliable water tight seal for the motor. The upper end of the bore in the seal bushing 70 is provided with a countersunk portion 71 to receive a small O-ring 72 which is compressed into the countersunk portion by an overlying down-turned cup-like member 73 which acts as a diving bell arrangement for preventing injury to the seal gasket 64. The seal guard is sandwiched between the lower end of the flywheel 28 and the upper end of the seal bushing 70.

Cooperating with the commutator 55 of the armature 40 is a pair of carbon brushes 80 which are diametrically opposed to each other on opposite sides of the commutator. A pair of suitable openings 81 are formed in the casting 42 of the motor housing so that the carbon brushes 80 may be inserted therein. The brush sub-assembly includes a flexible lead wire 82 that has one end connected to the back end of a brush 80 while its opposite end is fastened to a terminal disk 83. A coil spring 84 is interposed between the back end of the brush and the terminal disk for exerting pressure on the brush so that the brush is always in sliding contact with the commutator 55. The terminal disk is larger in diameter than the coil spring 84 and it is adapted to bear against a wire terminal 75 having a wire (not shown) that is connected back to one coil of the stator 41. A similar wire (not shown) is supplied with the other brush for connection with the other coil of the stator 41. A paper insulator 76 is sandwiched between the ground strap 46 and the wire terminal 75 to insulate them from each other. This terminal disk 83 is held in place against the wire terminal 75 by a rubber plug 85 which completes the filling of the opening 81 in the motor casting. There is a simple method of supporting the brushes in the motor; namely, by using the large metal cup member 86 which is fitted on the bottom of the motor casting and captures the rubber plugs 85 within the brush openings for ease in assembly and disassembly.

The carbon brushes 80 are subject to attrition, but this has never been a serious problem in the usual application of a fractional horsepower series motor as for instance in a small electric drill or a portable mixer. Most of the earlier applications of series wound motors have motor housings that are open so that the carbon dust created by attrition finds its way out of the motor housing where it enters the atmosphere. This manner of dissipating the carbon dust is not possible in an encapsulated series motor as in the present invention.

This dangerous condition has been obviated with the inclusion of a labyrinth located between the carbon brushes 80 and the lower motor bearing 45 so as to prevent the carbon dust from forming a conductive path between the brushes and the lower bearing. Such a labyrinth is made up of several elements which may be used singly or in combination. First, there is a down-turned cup-like shield 90 that is mounted on the lower shaft portion 56 of the rotor assembly 40 and is made integral therewith by being captured between a shoulder located beneath the commutator 55 and a thrust washer 92 that is positioned on top of the lower motor bearing 45. The periphery of this shield 90 is turned down so that its lower edge is arranged closely adjacent the top surface of the bottom wall 43 of the motor housing so that as the motor is operated the shield sets up a whirlwind which forces any carbon dust that has been released from the brushes to be propelled outwardly against a side wall of the cavity and away from beneath the shield. Moreover, a circular shoulder or collar 93 adjacent the upper portion of the motor bearing 45 is raised above such bearing so that the bearing is recessed within the bottom wall of the motor casting. The top portion of this collar 93 is located above the bottom edge of the shield 90 so that a labyrinth or tortuous path is formed. The introduction of this shielding means 90 and labyrinth to the motor design has increased the life expectancy of this type of encapsulated series motor several hundreds of times over the short life expectancies which were obtained during initial testing.

One other element is necessary for the motor design in order to complete its assembly. It shall be recalled that the lower shaft portion 56 of the rotor-shaft assembly 40 extends downwardly and outwardly of the motor casting. Also, there are motor lead wires (not shown) located within the metal cup 86 at the bottom of the motor and it is necessary to protect these lead wires from making contact with the rotating shaft 56. These wires are protected by applying a small secondary cup member 95 within the metal cup 86 and over the end of the shaft 56 as is illustrated.

Modifications of this invention will occur to those skilled in this art, therefore it is to be understood that this invention is not limited to the particular embodiments disclosed but that it is intended to cover all modifications which are within the true spirit and scope of this invention as claimed.

What we claim as new and desire to secure by Letters Patent of the United States is:

1. A series motor adapted for use in a vertical position, said motor comprising an armature and an encapsulated stator, the stator being formed into a non-magnetic motor housing, the lower end of the housing including a lower bearing, the upper end of the housing including an upper bearing member that is joined to the housing and serves to support and guide the upper end of the shaft of the rotor, the lower end of the armature including a commutator, and opposed openings formed in the motor housing, there being a carbon brush member supported in each said opening for engaging the commutator, the armature having a lower shaft portion extending beneath the commutator and into the lower bearing, and a cup-like shield fastened to the lower shaft portion of the armature to overlie the lower bearing and provide a labyrinth so that carbon dust released from the brushes by attrition will be unable to form a conductive path between the brushes and bearing, said shield having a down-turned portion radially spaced from said lower bearing.

2. In a series motor adapted for use in a vertical position, said motor comprising an armature and a stator encapsulated in an epoxy resin to form a non-magnetic motor housing, the lower end of the housing having a bottom wall that supports a fixed bearing for receiving the armature, the upper end of the housing having a wide opening for the introduction of the armature into the housing, and a separable bearing structure supported in the upper end of the housing for supporting and guiding the upper end of the armature, and fastening means for holding the separable bearing in place, a commutator included at the lower end of the armature, the motor housing having carbon brushes that engage the commutator, and a cup-like shield fastened to the shaft portion beneath the commutator and closely overlying the fixed bearing thereby providing a labyrinth so that carbon dust released from the brushes by attrition will be unable to form a conductive path to the fixed bearing so as to short out the motor, said shield having a down-turned portion radially spaced from said fixed bearing.

3. In a series motor adapted for use in a vertical position, said motor comprising an armature and a stator that is cast into a non-magnetic material to form the motor housing, the lower end of the housing having the bottom wall with a lower bearing fixed in the center thereof, the upper end of the housing having a relatively large opening through which the armature may be installed in the motor housing, a separable bearing member for supporting and guiding the upper end of the armature, and fastening means for attaching the separable bearing across the upper end of the motor housing, a commutator included with the armature adjacent the bottom portion thereof, and carbon brush means combined in the motor housing for making engagement with said commutator, the bottom wall of the housing having a raised shoulder encircling the fixed bearing therein, and a relatively large down-turned cup-shaped shield fastened to the armature shaft beneath the commutator and closely adjacent the said raised shoulder for cooperation therewith, thereby forming a labyrinth so that carbon dust released from the brushes by attrition will be prevented from forming a conductive path to the fixed bearing so as to short out the motor.

4. In a series motor as recited in claim 3 wherein there are opposed openings cast in the motor housing, there being a carbon brush member supported in each opening for engaging the commutator, a grounding strap cast in the motor housing and connecting the said stator with the fixed bearing in the bottom of the housing to thereby establish continuity between the stator and the armature and connecting means connecting each brush with the staid stator, and spring means bearing against each brush and normally biasing the brush into engagement with the commutator, an elastomeric plug member backing up the said spring member, and a relatively large cap member fitted over the bottom of the motor housing and thereby capturing the elastomeric plugs for holding the brushes assembled in the motor.

5. In a food waste disposal apparatus having a vertically extending hopper means with a top access opening for receiving water and waste material, rotatable comminuting means adjacent to the lower end of said hopper means, and power means below and operatively connected to both said hopper means and comminuting means and operable to drive said comminuting means, the invention comprising a series motor that is adapted for use in a vertical position as the power means, said motor comprising an armature and a stator encapsulated in an epoxy resin to form a non-magnetic motor housing, there being an armature located within the stator for operation therewith, the lower end of the motor housing having a bottom wall that supports a fixed bearing for receiving the armature, the upper end of the housing having a wide opening for the introduction of the armature into the housing, and a separable bearing structure supported in the upper end of the housing for supporting and guiding the upper end of the armature, and fastening means for holding the separable bearing in place, a commutator, located at the lower end of the armature, the motor housing having carbon brushes that engage the commutator, and a down-turned cup-like shield fastened to the shaft portion beneath the commutator and closely overlying the fixed bearing thereby providing a labyrinth so that carbon dust released from the brushes by attrition will be unable to form a conductive path to the fixed bearing so as to short out the motor, the upper end of the motor housing forming a hollowed out portion which constitutes a sump that underlies the comminuting means, and a drain connection made to the sump for carrying off the water-entrained waste material.

6. In a waste disposal apparatus having a vertically extending hopper means with a top access opening for receiving water and waste material therethrough, rotatable comminuting means adjacent to the lower end of said hopper means, and a series motor located beneath the comminuting means and arranged in a vertical position for driving said comminuting means, the invention comprising a rotatable armature and a fixed stator that is cast into a non-magnetic material for forming the motor housing, the upper end of the motor housing being extended to form a cavity which serves as a sump beneath the comminuting means, and a drain line connected to the sump for carrying off the water-entrained waste material, the lower end of the motor housing having a bottom wall with a lower bearing fixed in the center thereof, the upper end of the housing having a relatively large opening through which the armature may be installed in the motor housing, a separable bearing member for supporting and guiding the upper end of the armature, and fastening means for attaching the separable bearing across the upper end of the motor housing, a commutator included with the armature adjacent the bottom portion thereof, and carbon brush means combined in the motor housing for making engagement with said commutator, the bottom wall of the housing having a raised shoulder encircling the fixed bearing therein, and a relatively large down-turned cup-shaped shield fastened to the armature shaft beneath the commutator and closely adjacent the said raised shoulder for cooperation therewith thereby forming a labyrinth so that carbon dust released from the brushes by attrition will be prevented from forming a conductive path to the fixed bearing so as to short out the motor.

7. In a series motor adapted for use in a vertical position, said motor comprising an armature and a stator encapsulated in an epoxy resin to form a non-magnetic motor housing, the lower end of the housing having a bottom wall that supports a fixed bearing for receiving the armature, the upper end of the housing having a wide opening for the introduction of the armature into the housing, and a separable bearing structure supported in the upper end of the housing for supporting and guiding the upper end of the armature, and fastening means for holding the separable bearing in place, a commutator included at the lower end of the armature, the motor housing having carbon brushes that engage the commutator, a down-turned cup-like shield fastened to the shaft portion beneath the commutator and closely overlying the fixed bearing thereby providing a labyrinth so that carbon dust released from the brushes by attrition will be unable to form a conductive path to the fixed bearing so as to short out the motor, opposed openings formed in the motor housing and a carbon brush member supported in each opening, and spring means located behind each carbon brush and a resilient plug of elastomeric material placed behind the spring, there being a relatively large cap member fitted over the bottom of the motor housing and over the said plugs for holding the brushes in place as well as insulating the brushes from the cap member.

References Cited by the Examiner

UNITED STATES PATENTS

| | | | |
|---|---|---|---|
| 1,244,846 | 10/17 | Friend | 310—157 X |
| 2,951,650 | 9/60 | Gould. | |
| 2,970,777 | 2/61 | Hardy et al. | |
| 3,005,595 | 10/61 | Jenkins. | |

J. SPENCER OVERHOLSER, *Primary Examiner.*

EDWARD J. MICHAEL, *Examiner.*